(12) United States Patent
Pomeroy et al.

(10) Patent No.: US 12,137,078 B1
(45) Date of Patent: Nov. 5, 2024

(54) MITIGATION OF CARRIER GRADE NAT

(71) Applicant: CSC Holdings, LLC, Bethpage, NY (US)

(72) Inventors: John Pomeroy, Lake Grove, NY (US); Chris Zydel, Dix Hills, NY (US); Min Cheng David Wang, Port Jeff Station, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

(21) Appl. No.: 17/743,891

(22) Filed: May 13, 2022

(51) Int. Cl.
*H04L 61/5014* (2022.01)
*H04L 61/5053* (2022.01)

(52) U.S. Cl.
CPC ...... *H04L 61/5014* (2022.05); *H04L 61/5053* (2022.05)

(58) Field of Classification Search
None
See application file for complete search history.

(56) References Cited

U.S. PATENT DOCUMENTS

| | | | |
|---|---|---|---|
| 9,866,522 B2* | 1/2018 | Chatterjee | H04L 41/12 |
| 11,665,131 B1* | 5/2023 | Subramanian | H04L 67/1004 |
| | | | 709/245 |
| 2011/0235549 A1* | 9/2011 | Ahlers | H04L 41/08 |
| | | | 370/255 |
| 2013/0166776 A1* | 6/2013 | Gao | H04L 61/2514 |
| | | | 709/245 |
| 2013/0346629 A1* | 12/2013 | Wang | H04L 61/2532 |
| | | | 709/245 |
| 2016/0072764 A1* | 3/2016 | Arshinov | H04L 61/2557 |
| | | | 709/245 |
| 2022/0329563 A1* | 10/2022 | Yeh | H04L 12/4641 |

* cited by examiner

*Primary Examiner* — Mohamed Ibrahim
(74) *Attorney, Agent, or Firm* — Sterne, Kessler, Goldstein & Fox P.L.L.C.

(57) ABSTRACT

Disclosed herein are system, method, apparatus, and computer program product embodiments for dynamic mitigation of CGN IPv4 address provisioning for network gateways when adverse conditions are in effect. A network gateway may be provisioned with a shared WAN IP address from a pool of IP addresses designated for Carrier Grade Network Address Translation (CGN) and configured to detect the occurrence of an adverse condition for a connection provisioned the shared WAN IP address. Upon detecting an adverse condition, the network gateway may send a request for a new IP address to a DHCP server configured to recognize flags indicating an adverse condition. The DHCP server may then provision the gateway with a new public IP address.

20 Claims, 7 Drawing Sheets

MITIGATION OF CARRIER GRADE NAT

BACKGROUND

As an ever increasing number of devices seek to connect to the Internet, the supply of Internet Protocol version 4 (IPv4) addresses is becoming exhausted leading to increased costs for both Internet Service Providers (ISPs) and customers. While transitioning to Internet Protocol version 6 (IPv6) would be an ideal solution, a full transition to IPV6 is still in the distant future. Consequently, ISPs are increasingly turning to Carrier Grade Network Address Translation (CGN/CGNAT) to provide Internet connectivity to customers. While CGN allows for several customers to share a single IPv4 address and thus limits the need for ISPs to continuously purchase increasingly unavailable IPv4 addresses, the use of CGN is known to cause poor user experiences for some customers such as those using dynamically created Port Forwarding rules. As such, there is a need for a system that automatically detects conditions that cause poor customer experiences for a connection using CGN, removes the customer from the CGN pool, and assigns the connection a unique public IPv4 address.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for dynamic mitigation of CGN IPv4 address provisioning for network gateways when adverse conditions are in effect. A network gateway may be a client premises eRouter or standalone router used to connect devices in a customer's home network to the Internet via the ISP network. The ISP may be implementing CGN to connect at least a portion of its internet service customers to the Internet.

Carrier Grade Network Address Translation (CGN) enables the ISP to assign a single IPv4 address, from a pool of addresses designated for CGN, to multiple customers. This allows the ISP to more efficiently utilize the increasingly limited resource and thus service more customers without a need to purchase additional IPv4 addresses. However, CGN implementation involves double network address translation (NAT) (i.e., two or more routers on the network performing network address translation) which may cause an adverse customer experience under certain circumstances. Double NAT disrupts end-to-end network communication, meaning that the devices at the edges of the network can no longer communicate. Because double NAT obfuscates the customer router/gateway and makes it unreachable from the Internet, end-to-end communication becomes disrupted. This is generally not a problem for most customers who don't require their network to be directly reachable from the Internet. However, for customers who want the ability to host services that are exposed to/accessible from the Internet on their devices, CGN is not a viable solution.

The approach of dynamic CGN mitigation addresses the need to reduce the number of IPV4 addresses needed while also accommodating customers for whom CGN may not be a viable option, thus allowing for improved efficiency without compromising customer experience.

Figure 1:
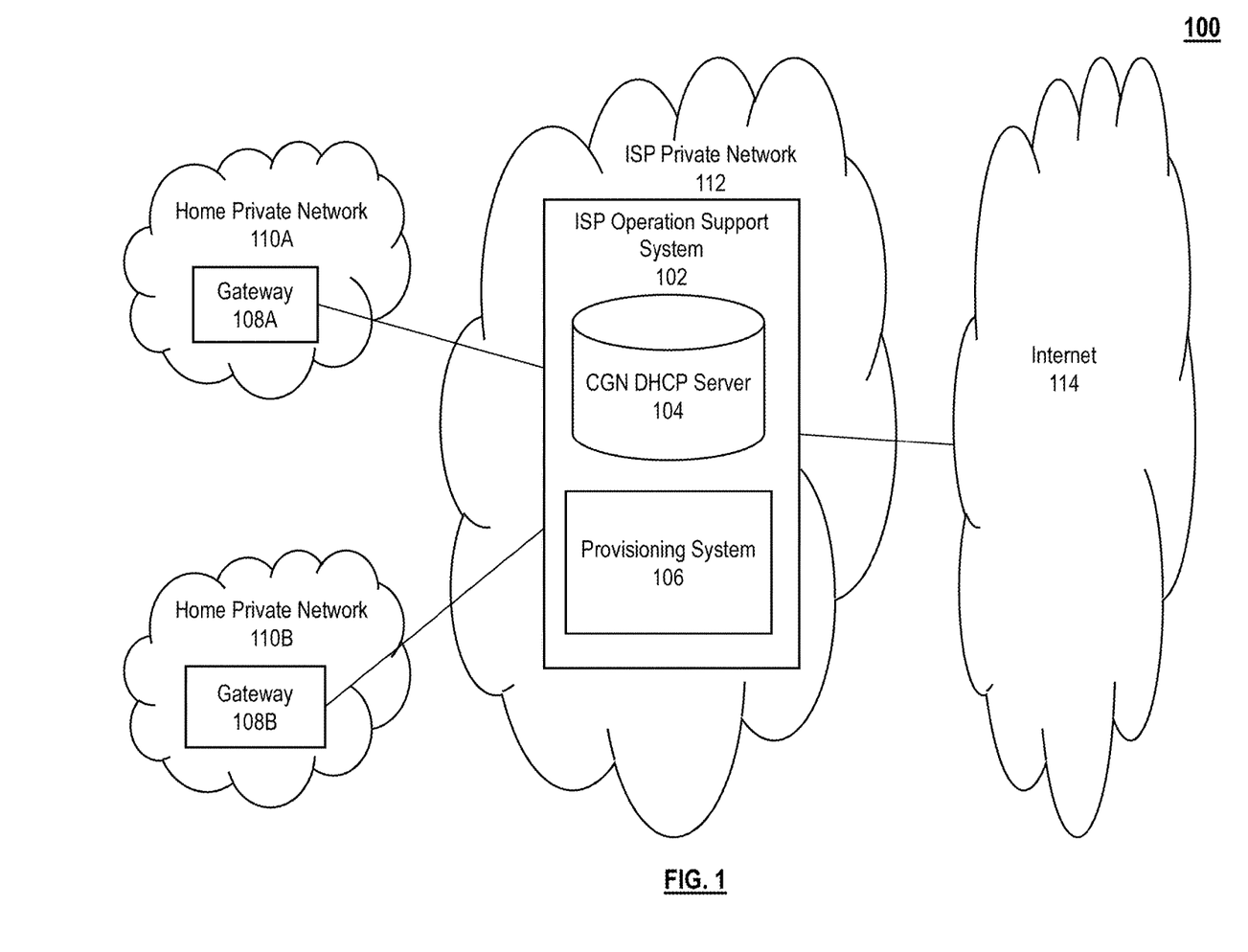
FIG. 1 is an example block diagram illustrating a system for implementing dynamic Carrier Grade Network Address Translation (CGN) mitigation, in accordance with some embodiments.

FIG. 1 illustrates a block diagram of a system 100 for implementing dynamic CGN mitigation, in accordance with some embodiments. As shown in FIG. 1, system 100 may include home private networks 110, ISP private network 112, and the Internet 114. In some embodiments, home private networks 110 may be local area networks (LANs) connected to ISP private network 112. ISP network 112 may be a wide area network (WAN) managed by the ISP. Gateways 108 may facilitate the connection between home private networks 110 and ISP private network 112.

In some embodiments, the ISP may use ISP operation support system (OSS) 102 to manage ISP network 112. OSS 102 may be responsible for managing several aspects of the ISP's operations including service provisioning, network inventory, network configuration, etc. OSS 102 may comprise CGN DHCP server 104 and provisioning system 106. Provisioning system 106 may be configured to manage CGN implementation across ISP network 112. For example, provisioning system 106 may determine which customer accounts are initially eligible for CGN based on eligibility requirements predetermined by the ISP. Additionally or alternatively, provisioning system 106 may determine a customer account's eligibility for CGN based on known information regarding the customer's initial setup. For example, the customer account may indicate that the customer intends to participate in the ISP's "Bring Your Own Router" option. Accordingly, provisioning system 106 may determine that the customer account is not eligible for CGN as "Bring Your Own Router" a CGN risk condition that would create a disconnect in end-to-end communication of network devices.

CGN DHCP server 104 may comprise one or more computing devices configured to manage IP addresses for the ISP. In some embodiments, CGN DHCP server 104 may be configured to manage provisioning of a pool of IPV4 addresses designated specifically for CGN use. Additionally or alternatively, CGN DHCP server 104 may be configured to manage provisioning of both CGN and non-CGN IP addresses. The ISP may have multiple DHCP servers (not shown) which may manage or be configured to manage provisioning of CGN, non-CGN, or both types of IP addresses.

In some embodiments, gateways 108 may be configured as DHCP clients and may thus communicate with CGN DHCP server 104 to receive IP addresses and other network configuration information. The customer accounts associated with gateways 108 may be determined to be CGN eligible by provisioning system 106. Accordingly, on initial boot up, gateway 108A and gateway 108B may each be provisioned with a shared IPV4 address from the pool of CGN IP addresses managed by DHCP server 104. In some embodiments, both gateway 108A and gateway 108B may be assigned the same shared IPv4 address. Alternatively, gateways 108A and 108B may each be assigned a different shared IPV4 address from the CGN IP address pool.

In some embodiments, there may be a defined maximum number of gateways that can share a single CGN IP address at any given time. As such CGN DHCP server 104 may be configured to provision CGN IP addresses such that each address is shared among a predetermined number of gateways. For example, CGN DHCP server 104 may assign a given CGN IP address to the predetermined number of gateways (e.g., 16 gateways) before DHCP server 104 no longer considers the given CGN IP address available for lease. In some embodiments, the predetermined number of gateways may be less than the maximum number of gateways that can share the CGN IP address. Accordingly, CGN DHCP server 104 may determine the given CGN IP address can be assigned to additional gateways once all the IP addresses within the CGN IP address pool have been exhausted (i.e., all the IP addresses have been assigned to the predetermined number of gateways). Alternatively, CGN DHCP server 104 may be configured to determine if a given CGN IP address is available for lease based on other parameters such as the traffic load on the given CGN IP address.

Figure 2:
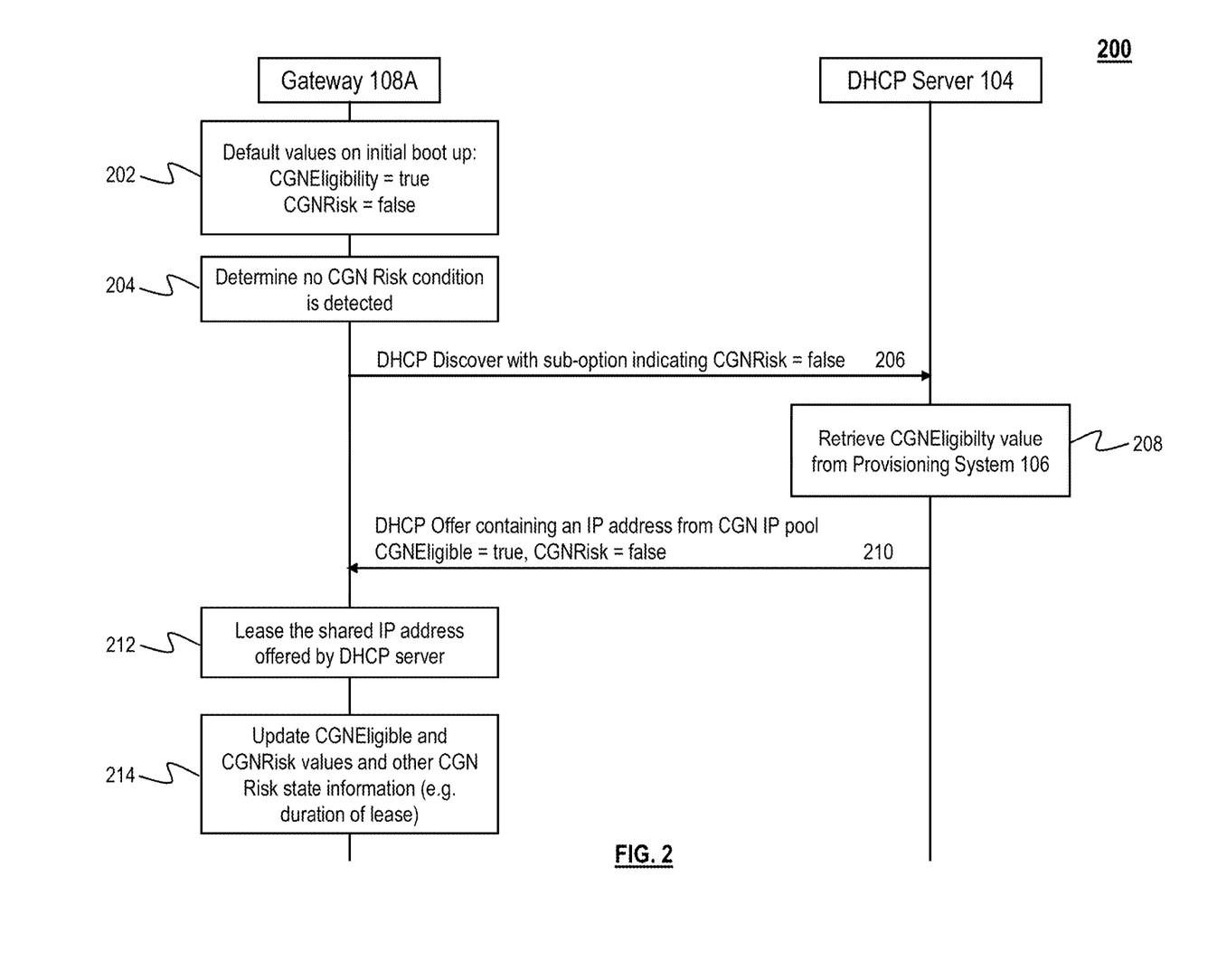
FIG. 2 is a sequence diagram illustrating a process for provisioning a network gateway with a shared internet protocol (IP) address from a CGN IP address pool, in accordance with some embodiments.

FIG. 2 illustrates process 200 for provisioning network gateway 108A with a shared IPv4 address from a CGN IP address pool, in accordance with some embodiments. Process 200 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 2 may not need to be performed in the exact order shown, as will be understood by a person of ordinary skill in the art. Accordingly, the scope of the invention should not be considered limited to the specific arrangement of steps shown in FIG. 2. Process 200 shall be described with reference to FIG. 1. However, process 200 is not limited to that example embodiment.

Process 200 may occur at initial bootup of CGN eligible network gateway 108A. Network gateway 108A may be configured to store and manage flags indicating the CGN eligibility of the gateway and whether a CGN risk condition is in effect. The flag indicating the CGN eligibility of gateway 108A may be referred to as "CGNEligible" and may have a default value of "True" at initial bootup. The flag indicating whether a CGN risk condition is in effect on gateway 108A may be referred to as "CGNRisk" and may have a default value of "False." At 202, network gateway 108A may perform an initial bootup and initialize the CGNEligible and CGNRisk flags with the initial values.

At 204, gateway 108A may check to determine whether a CGN risk condition is in effect. In some embodiments, gateway 108A may be configured to detect when any CGN risk conditions are created. Examples of CGN risk conditions may include creation of a Port Forward rule, enabling of a Port Trigger, designation of a demilitarized zone (DMZ) host, enabling of a media access control address (MAC) bypass, etc. Gateway 108A may determine that no CGN risk condition is in effect and accordingly maintain the CGNRisk flag value as "False."

At 206, gateway 108A may request an IP address from DHCP server 104. Gateway 108A may be configured as a DHCP client and communicate with DHCP server 104 using dynamic host configuration protocol (DHCP). Thus, gateway 108A may request an IP address by sending a DHCP Discover message to DHCP server 104.

DHCP messages sent between DHCP server 104 and DHCP client gateway 108A may include DHCP Options. Some DHCP Options may have standard definitions and are used to communicate specific information between DHCP servers and clients. However, a few DHCP Options do not have standard definitions and may be configured to communicate non-standard configuration information. For example, DHCP Option 43 is used to communicate vendor-specific configuration information between DHCP servers and clients.

In some embodiments, the DHCP Discover message sent by gateway 108A at 206 may include DHCP Option 43 sub-options indicating the CGN eligibility of gateway 108A and whether a CGN risk condition is in effect for gateway 108A. These DHCP Option 43 sub-options may be CGNEligible and CGNRisk. Gateway 108A may set values for these sub-options based on the values of the CGNEligible and CGNRisk flags maintained by gateway 108A. Accordingly, the DHCP Discover message sent by gateway 108A at 206 may include DHCP Option 43 sub-options CGNEligible="True" and CGNRisk="False."

At 208, upon receiving the DHCP Discover message from gateway 108Am, DHCP server 104 may communicate with provisioning system 106 to retrieve a CGNEligible value for the account associated with gateway 108A. Since gateway 108A is requesting a new IP address on initial bootup, the CGNEligible value is assumed to be the default value and thus DHCP server 104 may confirm whether the account associated with gateway 108A is indeed CGN eligible.

At 210, upon confirming that network gateway 108A is CGN eligible, DHCP server 104 may generate and send a DHCP Offer message to gateway 108A. As the DHCP Discover message from gateway 108A indicated that no CGN risk condition is in effect, the DHCP Offer message may include an available CGN IP address from the pool of CGN IP addresses.

Additionally, in some embodiments, the DHCP Offer message may include DHCP Option 43 sub-options CGNEligible and CGNRisk with values of "True" and "False" respectively. The DHCP Option 43 sub-options in the DHCP Offer message my serve as an indication to the DHCP client, gateway 108A, that DHCP server 104 is configured to implement dynamic CGN mitigation by recognizing the DHCP Option 43 sub-options sent from gateway 108A and provisioning either a shared CGN or public IP address accordingly.

At 212, gateway 108A may receive the DHCP Offer message from DHCP server 104 comprising a shared (CGN) IP address and network configuration information (e.g., IP address lease duration, client IP address, default gateway IP address, DNS IP address, etc.). Upon receiving the DHCP Offer message, gateway 108A may determine whether DHCP server 104 is configured to implement CGN mitigation by checking if the message includes DHCP Option 43 sub-options CGNEligible and CGNRisk. If gateway 108A determines that DHCP server 104 is not configured to implement CGN mitigation, gateway 108A may in turn determine that the offered IP address, whether a shared CGN or public IP address, is the assigned address and will not send a DHCP Discover message to DHCP server 104 in response to detecting a CGN risk condition. Instead gateway 108A may keep the assigned IP address regardless of whether a CGN risk condition is in effect.

After determining whether DHCP server 104 is configured to implement CGN mitigation, gateway 108A may proceed to lease the offered CGN IP address. In order to lease the offered IP address, gateway 108A may send a DHCP Request message requesting the offered IP address. Upon receiving the DHCP Request message from gateway 108A, DHCP server 104 may respond with a message confirming that gateway 108A has been assigned the offered CGN IP address. The response message may be a DHCP Ack message and include configuration information regarding the IP address lease such as the duration of the lease. Additionally, the response message may include DHCP Option 43 sub-options, CGNEligible and CGNRisk along with their respective values. Upon receiving the DHCP Ack message from DHCP server 104 confirming lease of the offered CGN IP address, gateway 108A may configure home network 110A according to the configuration parameters included in the message.

At 214, gateway 108A may store the network configuration information in non-volatile memory (e.g., NVRAM). In some embodiments, gateway 108A may also update the value of the CGNEligible flag, with the value received from DHCP server 104 in the DHCP Ack message. This ensures that changes to the CGN eligibility of gateway 108A made by provisioning system 106 are propagated to gateway 108A.

Figure 3:
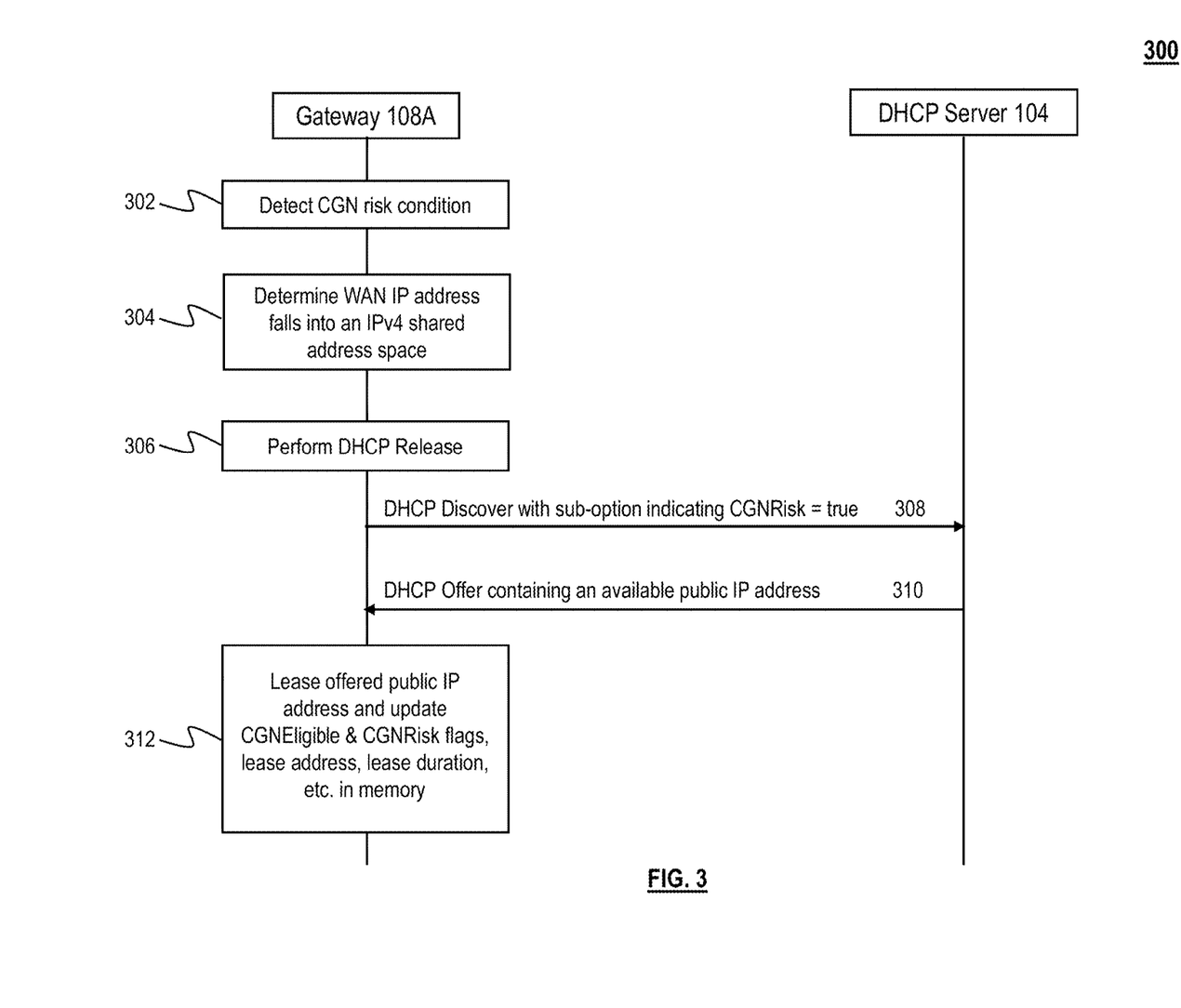
FIG. 3 is a sequence diagram illustrating a process for dynamic CGN mitigation due to an adverse condition detected by a network gateway, in accordance with some embodiments.

FIG. 3 illustrates a process for dynamic CGN mitigation due to an adverse condition detected by a network gateway, in accordance with some embodiments. Process 300 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 3 may not need to be performed in the exact order shown, as will be understood by a person of ordinary skill in the art. Accordingly, the scope of the invention should not be considered limited to the specific arrangement of steps shown in FIG. 3. Process 300 shall be described with reference to FIG. 1. However, process 300 is not limited to that example embodiment.

Process 300 may occur at any point during the operation of gateway 108A and may be triggered when a user on home network 110A, using network gateway 108A creates a CGN risk condition on network gateway 108A.

At 302, gateway 108A may detect the creation of CGN risk condition. A CGN risk condition may include creation of a Port Forward rule, enabling of a Port Trigger, designation of a demilitarized zone (DMZ) host, enabling of a media access control address (MAC) bypass, etc. For example, a user using gateway 108A may want to host a private gaming server in order to facilitate multiplayer gaming with friends outside home network 110A. In order to achieve this, the customer may create Port Forwarding rules. As noted above, port forwarding creates an adverse condition for a CGN enabled network. As such, gateway 108A may initiate dynamic mitigation of CGN to avoid a poor experience for the user.

At 304, gateway 108A may verify that its WAN IP address falls into an IPV4 shared address space. An IPV4 shared address space may be the range of IPV4 addresses that have been designated for us CGN by the ISP (i.e., IP addresses in the CGN IP address pool). In some embodiments, the range of IP addresses designated for CGN may begin with a certain sequence of numbers. Gateway 108A may be configured to determine whether a given IP address falls into the CGN address space (shared address space) by identifying whether the IP address begins with the specified sequence At 306, upon determining that its WAN IP address falls into the CGN IP address space, gateway 108A may perform a DHCP Release to deactivate the CGN IP address. In some embodiments, gateway 108A may send a DHCP Release message to DHCP server 104 indicating that gateway 108A no longer needs the CGN IP address it has been assigned. Upon receiving the DHCP Release message from gateway 108A, DHCP server 104 may update its database to remove gateway 108A (the DHCP client) from the record clients leasing the particular shared IP address. This process frees up a slot for another client to lease the shared IP address.

At 308, gateway 108A may send a DHCP Discover message to DHCP server 104 to request a public IP address. The DHCP Discover message may include DHCP Option 43 sub-options CGNEligible and CGNRisk. Since the CGN eligibility of gateway 108A has not changed, the value of CGNEligible may remain "True." However, there is now a CGN risk condition in effect on gateway 108A. Accordingly, the value of CGNRisk in the DHCP Discover message will be updated to "True."

At 310, upon receiving the DHCP Discover message from gateway 108A, DHCP server 104 may send a DHCP Offer message to gateway 108A. The DHCP Offer message may include a public IP address that is available for lease. The public IP address offered will not be from the CGN IP address pool but rather from a separate public IP address pool managed by DHCP server 104. Unlike the shared CGN IP addresses, a public IP address can only be leased and utilized by one client (gateway) at any given time. As such, DHCP server 104 may verify that the offered public IP address has not already been assigned to and currently in use by another client before including it in the DHCP Offer message.

At 312, gateway 108A may receive the DHCP Offer message from DHCP server 104 and proceed to lease the offered public IP address using the process described above. After completing the IP address leasing and network configuration process, gateway 108A may store new and updated CGN risk state information in non-volatile memory. CGN risk state information may include the CGNEligible and CGNRisk flags, IP address lease duration, etc. Additionally, gateway 108A may record and store in non-volatile memory, a CGN risk timestamp. A CGN risk timestamp may indicate a time at which a CGN risk condition was last detected and may be updated each time a CGN risk condition is detected by gateway 108A.

Figure 4:
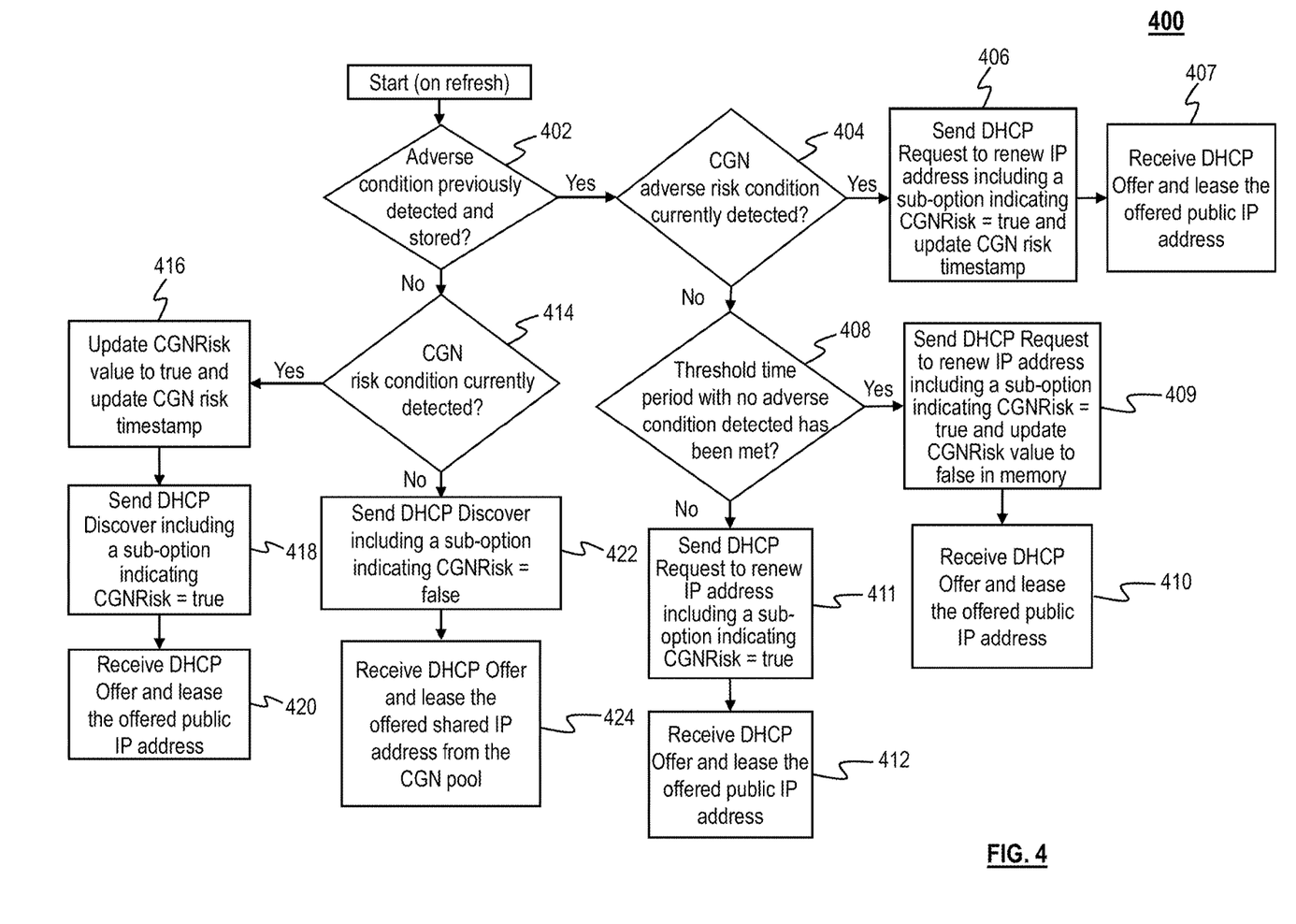
FIG. 4 is a flowchart illustrating a flow for implementing dynamic CGN mitigation, in accordance with some embodiments.

FIG. 4 illustrates a flowchart of an example flow for dynamic CGN mitigation, in accordance with some embodiments. Flow 400 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in FIG. 4 may not need to be performed in the exact order shown, as will be understood by a person of ordinary skill in the art. Accordingly, the scope of the invention should not be considered limited to the specific arrangement of steps shown in FIG. 4. Flow 400 shall be described with reference to FIG. 1. However, flow 400 is not limited to that example embodiment.

Process 400 may take place upon refresh of gateway 108A. A gateway refresh may occur on reboot of the gateway, WAN DCHP Renew, or any automatic or user-initiated network configuration change.

At 402, upon gateway refresh, gateway 108A checks the CGNRisk flag stored in non-volatile memory and determines whether an adverse condition for CGN (CGN risk condition) has previously been detected. The CGNRisk flag may be false by default on initial bootup and may be updated when CGN risk conditions occur on gateway 108A. Because process 400 starts upon refresh of the gateway and not at initial bootup of gateway 108A, the value of the CGNRisk flag stored in memory will not be the default value. Accordingly, if the stored CGNRisk flag is false, gateway 108A may determine that a CGN risk condition was not in effect before refresh and flow 400 proceeds to step 414. Otherwise, if the stored CGNRisk flag is true, gateway 108A may determine that a CGN risk condition was in effect before refresh and flow 400 proceeds to step 404.

At 404, gateway 108A verifies whether a CGN risk condition is currently in effect. If so, flow 400 proceeds to step 406. At 406, gateway 108A updates the CGN risk timestamp and requests renewal of the public IP address assigned to gateway 108A prior to refresh. Gateway 108A may do this by first verifying that it currently has a public IP address for which the lease duration has not lapsed. Upon verifying it has an active public IP address lease, gateway 108A may send a DHCP Request message to DHCP server 104 requesting renewal of the public IP address. The DHCP Request message may include DHCP Option 43 sub-options CGNEligible and CGNRisk. Since no changes have been made to the CGN eligibility of gateway 108A, CGNEligible may have a value of "True." CGNRisk may similarly have a value of "True" because a CGN risk condition is in effect on gateway 108A. DHCP server 104 may respond with a DHCP Ack message confirming renewal of the public IP address for gateway 108A. Additionally, the DHCP Ack message may include network configuration information that is needed by gateway 108A.

At 407, gateway 108A receives the DHCP Ack message from DHCP server 104. Upon receiving the DHCP Ack message, gateway 108A may lease the offered public CGN IP address through the DHCP process described above and configure home network 110A according to the configuration parameters included in the message.

Alternatively, if gateway 108A determines that no CGN risk condition is currently in effect at 404, flow 400 proceeds to step 408. At 408, gateway 108A determines if a threshold time period during which no CGN risk condition is detected has been met. The threshold time period may be a predetermined time period determined by the ISP. Additionally, or alternatively, the threshold time period may be based on the lease duration of the WAN IP address. For example, the ISP may determine the threshold time period to be equal to twice the WAN IP address lease duration. Gateway 108A may be configured to use the CGN risk timestamp to determine the amount of time that has lapsed since a CGN risk condition was last detected. Gateway 108A may then compare the time lapsed since the CGN risk timestamp to threshold time period to determine whether the threshold time period has been met. If the threshold time period has been met, flow 400 proceeds to step 409.

At 409, gateway 108A requests renewal of the public IP address assigned to gateway 108A prior to refresh and updates the stored CGNRisk flag value to false. Upon determining that the threshold time period has been met, Gateway 108A may send a DHCP Request message to DHCP server 104 requesting renewal of the public IP address assigned to it prior to refresh. The DHCP Request message may include DHCP Option 43 sub-options CGNEligible and CGNRisk, both having a value of "True." Additionally, gateway 108A may then update the stored CGNRisk flag to false indicating that a CGN risk condition is no longer in effect for gateway 108A.

DHCP server 104 may respond with a DHCP Ack message confirming renewal of the public IP address for gateway 108A. The DHCP Ack message may include network configuration information that is needed by gateway 108A. At 410, gateway 108A receives the DHCP Ack message from DHCP server 104. Upon receiving the DHCP Ack message, gateway 108A may lease the offered public CGN IP address through the DHCP process described above and configure home network 110A according to the configuration parameters included in the message.

Alternatively, if gateway 108 determines that the threshold time period has not been met at step 408, flow 400 proceeds to step 411. At step 411, gateway 108A requests renewal of the public IP address assigned to gateway 108A prior to refresh by sending a DHCP Request message to DHCP server 104 requesting renewal of the public IP address. The DHCP Request message may include DHCP Option 43 sub-options CGNEligible and CGNRisk, both having a value of "True." DHCP server 104 may respond to the DHCP Request message with a DHCP Ack message confirming renewal of the public IP address for gateway 108A.

At step 412, gateway 108A receives the DHCP Ack message from DHCP server 104 and proceeds to lease the offered public CGN IP address through the DHCP process described above. Gateway 108A may also configure home network 110A according to the configuration parameters included in the message.

Now referring back to step 402, gateway 108A may determine that a CGN risk condition was not in effect before refresh and thus flow 400 proceeds to step 414. At 414, gateway 108A verifies whether a CGN risk condition is currently in effect. If gateway 108A detects a CGN risk condition, flow 400 proceeds to step 416.

At 416, gateway 108A updates the CGNRisk flag to true indicating that a CGN risk condition is in effect, and the CGN risk timestamp to the time at which the CGN risk condition was detected.

At 418, gateway 108A sends a DHCP Discover message to DHCP server 104 requesting an IP address. The DHCP Discover message may include DHCP Option 43 sub-options CGNEligible and CGNRisk, both having a value of "True" indicating that gateway 108A is CGN eligible and that a CGN risk condition is in effect. DHCP server 104 may respond with a DHCP Offer message comprising a public IP address that is available for lease.

At 420, gateway 108A receives the DHCP Offer message from DHCP Server 104 and leases the offered public IP address through the DHCP process described above.

Referring back to step 414, if gateway 108A detects no CGN risk condition is in effect, flow 400 proceeds to step 422. At 422, gateway 108A sends a DHCP Discover message to DHCP server 104 requesting an IP address. The DHCP Discover message may include DHCP Option 43 sub-options CGNEligible and CGNRisk, with values of "True" and "False" respectively. The CGNEligible and CGNRisk values indicating that gateway 108A is CGN eligible and that no CGN risk condition is in effect. DHCP server 104 may respond with a DHCP Offer message comprising a shared CGN IP address, from the CGN IP address pool, that is available for lease.

At 424, gateway 108A receives the DHCP Offer message from DHCP server 104 and leases the offered shared CGN IP address through the DHCP process described above.

Figure 5:
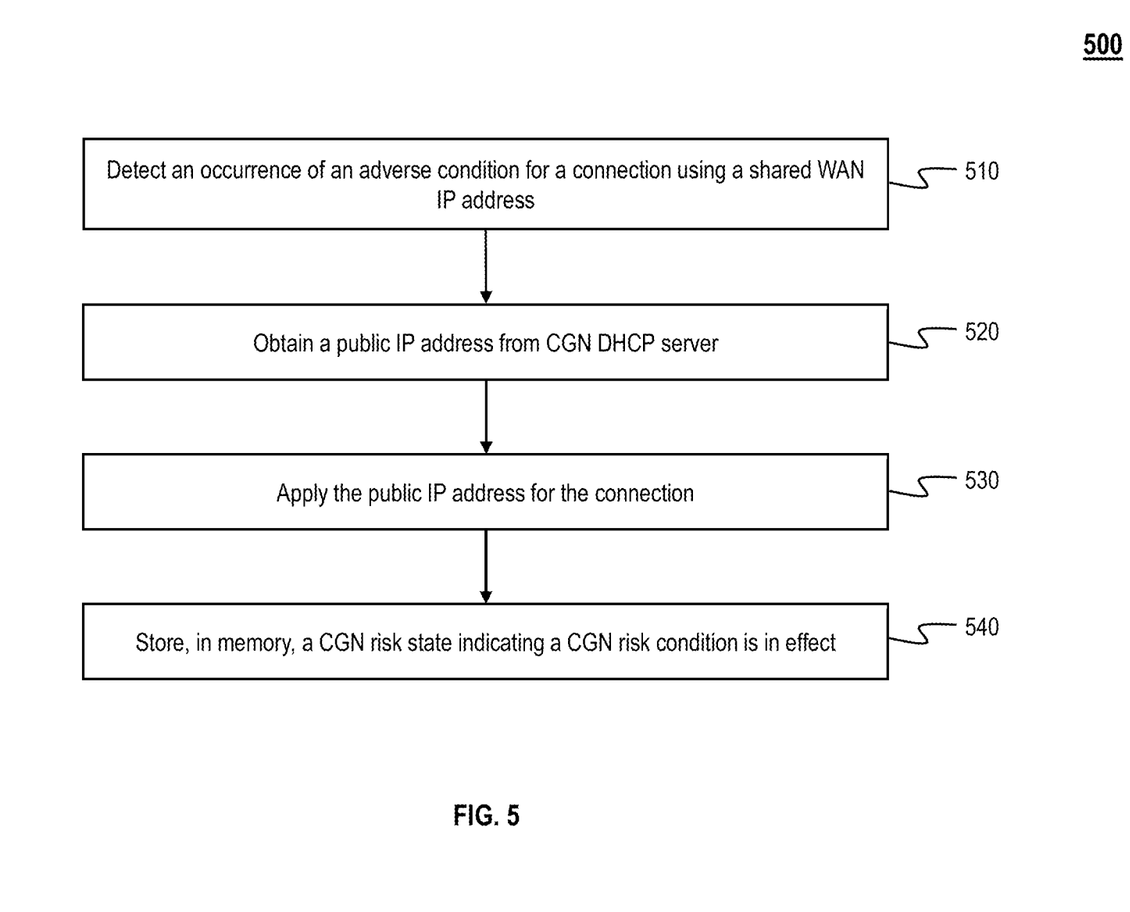
FIG. 5 is a flowchart illustrating an example method of mitigating CGN when an adverse condition is detected by a network gateway, in accordance with some embodiments.

FIG. 5 illustrates a flowchart for an example method of mitigating CGN when an adverse condition is detected by a network gateway, in accordance with some embodiments. Method 500 may be performed by processing logic that may include hardware (e.g., circuitry, dedicated logic, programmable logic, microcode, etc.), software (e.g., instructions executing on a processing device), or a combination thereof. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. Method 500 shall be described with reference to FIG. 1. However, method 500 is not limited to those example embodiments.

In 510, gateway 108A may detect an occurrence of an adverse condition for a connection using a shared WAN IP address. Gateway 108A may be a client premises equipment (CPE) on ISP network 112 and at least a portion of the customer accounts on ISP network 112, include that associated with gateway 108A, may be designated as CGN eligible by provisioning system 106. As such, the adverse condition detected by gateway 108A may be a CGN risk condition (e.g., creation of a Port Forward rule, enabling of a Port Trigger, designation of a DMZ host, enabling of a MAC address bypass, etc.).

In response to detecting the adverse condition, gateway 108A may release the shared CGN WAN IP address and request a new, public IP address from CGN DHCP server 104. Gateway 108A may do this by sending a DHCP Discover message including DHCP Option 43 sub-options CGNEligible and CGNRisk indicating that gateway 108A is CGN eligible and a CGN risk condition is in effect. In response the DHCP Discover message, gateway 108A may receive a DHCP Offer message from CGN DHCP server 104. The DHCP Offer message may include a public IP address available for lease.

In 520, gateway 108A may obtain a public IP address from CGN DHCP server 104 by requesting to lease the IP address offered in the DHCP Offer message. Gateway 108A may receive a DHCP Ack message confirming that it has been assigned the offered public IP address. The DHCP Ack message may also include additional network configuration information.

In 530, gateway 108A may apply the public IP address for the connection. Upon receiving the DHCP Ack message from DHCP server 104 confirming that it has been assigned the offered public IP address, gateway 108A may use the network configuration information included in the DHCP Ack message to configure home network 110A to use the new public IP address.

In 540, gateway 108A may store, in non-volatile memory, a CGN risk state indicating that a CGN risk condition is in effect. The CGN risk state stored by gateway 108A may include a CGN Risk status, which may be stored as a flag labeled "CGNRisk," and a CGN risk timestamp indicating the time at which a CGN risk condition was last detected. The CGN risk timestamp may be updated by gateway 108A each time it detects the occurrence of a CGN risk condition.

In some embodiments, gateway 108A may use the CGN risk timestamp to determine if a predetermined threshold time period has lapsed since a CGN risk condition was last detected. Gateway 108A may be configured to only update the CGN risk status (i.e., CGNRisk flag) to indicate that a CGN risk condition is no longer in effect after determining that the threshold time period has lapsed since a CGN risk condition was last detected. This approach reduces the frequency with which a network gateway may need to initiate dynamic CGN mitigation and thus the frequency with which it switches between CGN and non-CGN mode.

Figure 6A:
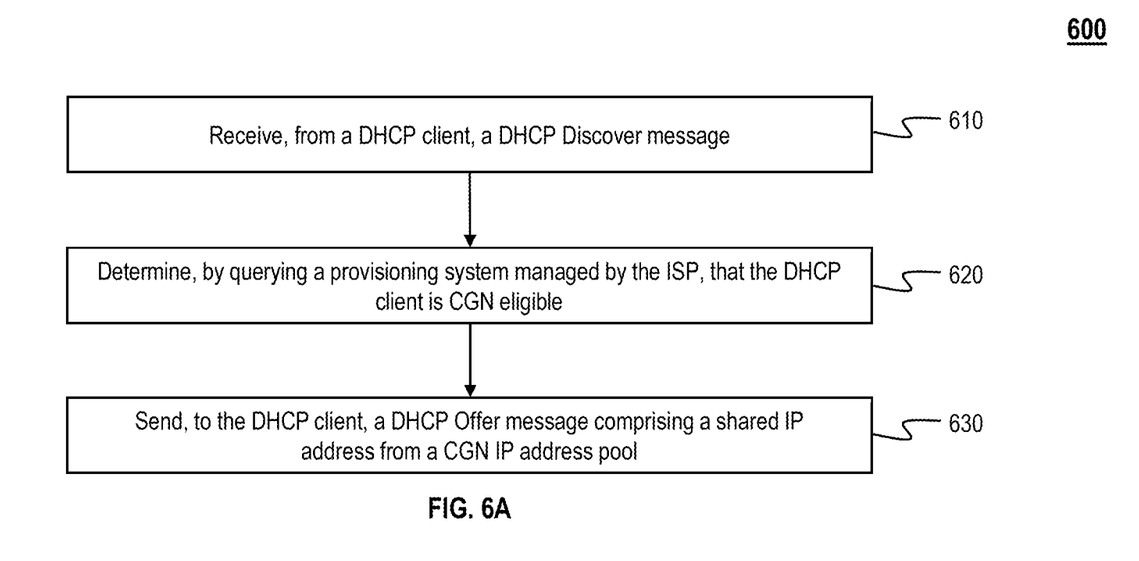
FIG. 6A and FIG. 6B are flowcharts illustrating example methods of provisioning a network gateway with a shared/CGN IP address or a public address based on the CGN eligibility and CGN risk status of the gateway, in accordance with some embodiments.
Figure 6B:
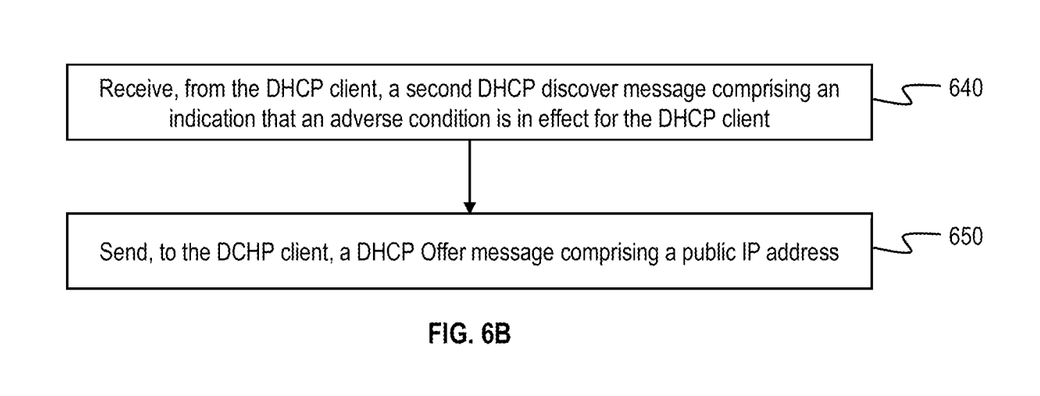

FIG. 6A and FIG. 6B illustrate flowcharts for example methods of provisioning a network gateway with a shared/CGN IP address or a public address based on the CGN eligibility and CGN risk status of the gateway, in accordance with some embodiments. Methods 600 may be performed by processing logic that may include hardware (e.g., circuitry, dedicated logic, programmable logic, microcode, etc.), software (e.g., instructions executing on a processing device), or a combination thereof. In one or more embodiments, one or more of the steps shown in FIGS. 6A and 6B may be omitted, repeated, and/or performed in a different order than the order shown in FIGS. 6A and 6B. Accordingly, the scope of the invention should not be considered limited to the specific arrangement of steps shown in FIGS. 6A and 6B. Methods 600 shall be described with reference to FIG. 1. However, methods 600 are not limited to those example embodiments.

FIG. 6A illustrates a flow chart for an example method of provisioning a CGN eligible network gateway on which no CGN risk condition is in effect with a shared CGN IP address. In 610, DHCP server 104 receives a DHCP Discover message from DHCP client, gateway 108A. The DHCP Discover message may include DHCP Option 43 sub-options, CGNEligible and CGNRisk indicating that gateway 108A is CGN eligible and no CGN risk condition is in effect on gateway 108A.

In 620, DHCP server 104 may determine, by querying provisioning system 106 that the DHCP client is CGN eligible, gateway 108A, is CGN eligible. DHCP server 104 may communicate with provisioning system 106 to retrieve the CGN eligibility of the account associated with gateway 108A. DHCP server 104 may then use the retrieved CGN eligibility to determine that gateway 108A is CGN eligible. Additionally, DHCP server 104 may use DHCP Option 43 sub-options, CGNRisk, to determine that no CGN risk condition is in effect on gateway 108A. Accordingly, DHCP server 104 may determine that gateway 108A can be provisioned with a shared CGN IP address without the risk of causing a poor customer experience.

In 630, DHCP server 104 may send a DHCP Offer message to DHCP client, gateway 108A. The DHCP Offer message may include a shared IP address from a designated CGN IP address pool. In response, DHCP client 104 may receive a DHCP Request message requesting to lease the offered shared IP address from gateway 108A. Upon receiving the response, DHCP server 104 may assign the offered shared IP address to gateway 108A. Additionally, DHCP server 104 may send a DHCP Ack message to gateway 108A confirming that the offered shared IP address has been assigned to gateway 108A. The DHCP Ack message may also include network configuration information such as IP address lease duration, client IP address, default gateway IP address, DNS IP address, etc. Gateway 108A may use this network configuration data to configure home network 110A.

FIG. 6B illustrates a flow chart for an example method of provisioning a network gateway on which a CGN risk condition is in effect with a public IP address. In 640, DHCP server 104 may receive a DHCP Discover message from DHCP client, gateway 108A. The DHCP Discover message may include DHCP Option 43 sub-options, CGNEligible and CGNRisk indicating that gateway 108A is CGN eligible and that a CGN risk condition is in effect on gateway 108A. DHCP server 104 may use the DHCP Option 43 sub-options, CGNEligible and CGNRisk, in the DCHP Discover message to determine that gateway 108A is CGN eligible and that a CGN risk condition is in effect on the gateway. Accordingly, DCHP server 104 may determine that gateway 108A cannot be provisioned with a shared CGN IP address without the risk of causing a poor customer experience.

In 650, DHCP server 104 may retrieve a public IP address that is available for lease and send a DHCP Offer message including the public IP address to gateway 108A. In response, DHCP server 104 may receive a DHCP Request message from gateway 108A requesting to lease the offered public IP address. Upon receiving the response, DHCP server 104 may assign the offered public IP address to gateway 108A and send a DHCP Ack message to gateway 108A confirming that it has been assigned the offed public IP address. The DHCP Ack message may also include network configuration information (e.g., IP address lease duration, client IP address, default gateway IP address, DNS IP address, etc.) which gateway 108A may use to configure home network 110A.

In some embodiments, DHCP server 104 may maintain a record of each time network gateway 108A initiates dynamic CGN mitigation and thus switches between CGN and non-CGN mode. DHCP server 104 may monitor this record to determine whether the frequency exceeds a predetermined frequency threshold over predefined period of time, wherein both the frequency threshold and predefined period of time are determined by the ISP. For example, the ISP may determine that the frequency threshold for network gateways 108 switching between CGN and non-CGN mode is 4 times over a period of 4 weeks. Accordingly, DHCP server 104 may continuously monitor how often gateway 108A switches between CGN and non-CGN mode over a rolling 4-week period.

In some embodiments, DHCP server 104 may be configured to generate a periodic report indicating the network gateways and/or associated customer accounts that have exceeded the frequency threshold. The frequency with which DHCP server 104 may generate this report may be configurable by the ISP. In some embodiments, report may be sent to provisioning system 106 which may be configured to update the CGN eligibility of gateways 108 based on the report. For example, provisioning system 106 may be configured to revoke CGN eligibility for the network gateways and/or associated customer accounts that are shown in the report to have exceeded the frequency threshold.

Various embodiments may be implemented, for example, using one or more well-known computer systems, such as a computer system 700, as shown in FIG. 6. One or more computer systems 700 may be used, for example, to implement any of the embodiments discussed herein, as well as combinations and sub-combinations thereof. The computer systems 700 may be used for the implementation of one or more embodiments described above.

Figure 7:
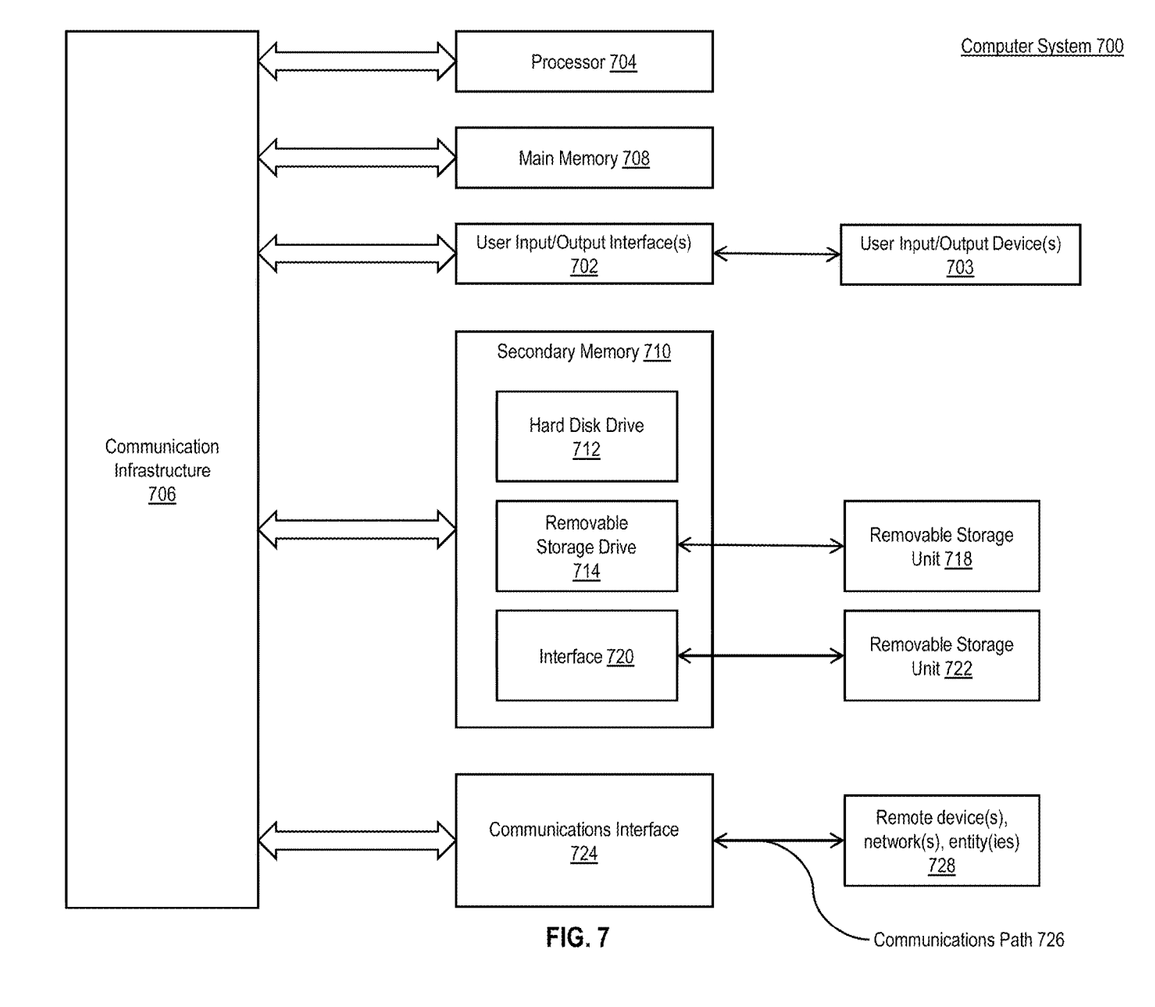
FIG. 7 is an example computer system useful for implementing various embodiments.

The computer system 700 may include one or more processors (also called central processing units, or CPUs), such as a processor 704. The processor 704 may be connected to a communication infrastructure or bus 706.

The computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 700 may also include a main or primary memory 708, such as random access memory (RAM). Main memory 708 may include one or more levels of cache. Main memory 708 may have stored therein control logic (i.e., computer software) and/or data.

The computer system 700 may also include one or more secondary storage devices or memory 710. The secondary memory 710 may include, for example, a hard disk drive 712 and/or a removable storage device or drive 714. The removable storage drive 714 may be a floppy disk drive, a magnetic tape drive, a compact disk drive, an optical storage device, tape backup device, and/or any other storage device or storage drive.

The removable storage drive 714 may interact with a removable storage unit 718. The removable storage unit 718 may include a computer-usable or readable storage device having stored thereon computer software (control logic) and/or data. The removable storage unit 718 may be a floppy disk, magnetic tape, compact disk, DVD, optical storage disk, and/any other computer data storage device. The removable storage drive 714 may read from and/or write to the removable storage unit 718.

The secondary memory 710 may include other means, devices, components, instrumentalities, or other approaches for allowing computer programs and/or other instructions and/or data to be accessed by the computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 700 may further include a communication or network interface 724. The communication interface 724 may enable the computer system 700 to communicate and interact with any combination of external devices, external networks, external entities, etc. (individually and collectively referenced by reference number 728). For example, the communication interface 724 may allow the computer system 700 to communicate with the external or remote devices 728 over communications path 726, which may be wired and/or wireless (or a combination thereof), and which may include any combination of LANs, WANs, the Internet, etc. Control logic and/or data may be transmitted to and from the computer system 700 via the communication path 726.

The computer system 700 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 700, the main memory 708, the secondary memory 710, and the removable storage units 718 and 722, as well as tangible articles of manufacture embodying any combination of the foregoing. Such control logic, when executed by one or more data processing devices (such as the computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A network gateway, comprising:
a memory; and
a processor coupled to the memory;
wherein the network gateway is configured as a Dynamic Host Configuration Protocol (DHCP) client, connected to an Internet Service Provider (ISP), and provisioned with a shared wide area network (WAN) internet protocol (IP) address from a pool of IP addresses designated for Carrier Grade Network Address Translation (CGN) by the ISP; and
wherein the processor is configured to:
    detect an occurrence of an adverse condition for a connection using the shared WAN IP address;
    store a CGN risk state indicating the adverse condition is in effect;
    obtain a public IP address, based at least on the detection, wherein obtaining the public IP address comprises:
        performing a DHCP Release to deactivate the shared WAN IP address, and
        sending, to a CGN DHCP server managed by the ISP, a DHCP Discover message including a DHCP Option comprising a first sub-option flag indicating the adverse condition has been detected;
    apply the public IP address for the connection; and
    upon refresh of the network gateway:
        determine that the adverse condition is in effect based on the stored CGN risk state; and
        send a DHCP Request to renew the public IP address for the connection.

2. The network gateway of claim 1, wherein to obtain the public IP address, the processor is further configured to:
receive, from the CGN DHCP server, a DHCP Offer message comprising the public IP address available for lease; and
lease the public IP address offered by the CGN DHCP server; and
wherein to store the CGN risk state indicating the adverse condition is in effect, the processor is further configured to:
store the CGN risk state in non-volatile memory.

3. The network gateway of claim 2, wherein the CGN risk state stored in the non-volatile memory comprises a CGN risk status indicating the adverse condition is in effect and a CGN risk timestamp indicating a time when detection of the adverse condition last occurred; and
wherein the CGN risk timestamp is updated each time the adverse condition is detected.

4. The network gateway of claim 3, wherein the processor is further configured to:
determine, upon each request to the CGN DHCP server to renew a lease on the public IP address, based on the CGN risk timestamp, if a threshold period during which no adverse condition is detected, has been met; and persist the CGN risk status indicating the adverse condition is in effect until the threshold period has been met.

5. The network gateway of claim 4, wherein the threshold period is based on a lease duration of the public IP address.

6. The network gateway of claim 4, wherein, upon determining the threshold period has been met, the processor is further configured to:

update, responsive to the determining, the stored CGN risk status to indicate that no adverse condition is in effect; and obtain, upon a next request to renew the lease on the public IP address, a new shared WAN IP address from the pool of IP addresses designated for the CGN by the ISP, wherein the request to renew the lease on the public IP address includes an updated first sub-option flag reflecting the updated CGN risk status.

7. The network gateway of claim 2, wherein the DHCP Offer message further comprises a second sub-option flag indicating that the network gateway is CGN eligible;

wherein CGN eligibility is determined by a provisioning system managed by the ISP; and wherein the CGN eligibility is used by the CGN DHCP server to determine if the network gateway can be provisioned with the shared WAN IP address from the pool of IP addresses designated for the CGN by the ISP.

8. The network gateway of claim 1, wherein the adverse condition comprises enabling of a Port Forward rule, enabling of a Port Trigger, designation of a demilitarized zone (DMZ) host, or enabling of a media access control address (MAC) bypass.

9. A system, comprising:
a memory; and
a processor coupled to the memory;
wherein the system is configured as a Carrier Grade Network Address Translation (CGN) Dynamic Host Configuration Protocol (DHCP) server operated by an Internet Service Provider (ISP); and
wherein the processor is configured to:
receive, from a DHCP client, a first DHCP Discover message, the first DHCP Discover message comprising a first sub-option flag indicating that the DHCP client is CGN eligible;
determine, by querying a provisioning system managed by the ISP, that the DHCP client is CGN eligible; and
send, to the DHCP client, responsive to the determining, a DHCP Offer message comprising a shared internet protocol (IP) address from a CGN IP address pool, wherein the CGN IP address pool comprises IP addresses designated for CGN by the ISP;
receive, from the DHCP client, a second DHCP Discover message, the second DHCP Discover message comprising a second sub-option flag indicating an adverse detection has been detected for a connection using the shared IP address; and
receive, from the DHCP client, a DHCP Request to renew a public IP address for the connection based on a refresh of the DHCP Request and an indication of the adverse detection stored at the DHCP client.

10. The system of claim 9, wherein:
CGN eligibility is determined by the provisioning system managed by the ISP,
the CGN eligibility is used to determine that the DHCP client can be provisioned with the shared IP address from the CGN IP address pool; and wherein the first DHCP Discover message further comprises a third sub-option flag indicating that no adverse condition is in effect for the DHCP client.

11. The system of claim 10, wherein the DHCP Offer message further comprises:
a fourth sub-option flag indicating the DHCP client is CGN eligible; and
a fifth sub-option flag indicating that no adverse condition is in effect for the DHCP client.

12. The system of claim 9, wherein the processor is further configured to:
send, to the DHCP client, based on the second sub-option flag, a DHCP Offer message comprising the public IP address.

13. The system of claim 12, wherein the adverse condition comprises enabling of a Port Forward rule, enabling of a Port Trigger, designation of a demilitarized zone (DMZ) host, or enabling of a media access control address (MAC) bypass.

14. The system of claim 12, wherein the processor is further configured to:
maintain, for the DHCP client, a record comprising a frequency of changes in existence of the adverse condition for the DHCP client during a predefined duration;
determine, based on the record, that the frequency exceeds a predetermined threshold for the predefined duration; and
generate, based on the determining, a report for the provisioning system, wherein the provisioning system is configured to update the CGN eligibility of the DHCP client based on the report.

15. The system of claim 9, wherein the DHCP client is a client premises equipment (CPE) gateway.

16. A computer implemented method for dynamic Carrier Grade Network Address Translation (CGN) mitigation, comprising:
detecting, by a network gateway, an occurrence of an adverse condition for a connection using a shared wide area network (WAN) internet protocol (IP) address;
storing a CGN risk state indicating the adverse condition is in effect;
obtaining, by the network gateway, a public IP address, based at least on the detection, wherein obtaining the public IP address comprises:
performing a Dynamic Host Configuration Protocol (DHCP) Release to deactivate the shared WAN IP address, and
sending, to a CGN DHCP server managed by an Internet Service Provider (ISP), a DHCP Discover message including a DHCP Option comprising a sub-option flag indicating the adverse condition has been detected;
applying, by the network gateway, the public IP address for the connection; and
upon refresh of the network gateway:
determining that the adverse condition is in effect based on the stored CGN risk state; and
sending a DHCP Request to renew the public IP address for the connection;
wherein the network gateway is configured as a DHCP client, connected to the ISP, and provisioned with the shared WAN IP address from a CGN IP address pool comprising addresses designated for CGN by the ISP.

17. The computer implemented method of claim 16, wherein obtaining the public IP address further comprises:

receiving, from the CGN DHCP server, a DHCP Offer message comprising the public IP address available for lease;

leasing the public IP address offered by the CGN DHCP server; and storing, in non-volatile memory, a CGN risk status indicating the adverse condition is in effect and a CGN risk timestamp indicating a time when detection of the adverse condition last occurred, wherein the CGN risk timestamp is updated each time the adverse condition is detected.

18. The computer implemented method of claim 17, further comprising:

determining, by the network gateway, upon each request to the CGN DHCP server to renew a lease on the public IP address, whether a threshold period during which no adverse condition is detected, has been met; and persisting the CGN risk status indicating the adverse condition is in effect until the threshold period has been met.

19. The computer implemented method of claim 18, further comprising:

updating, by the network gateway, upon determining the threshold period has been met, the stored CGN risk status to indicate that no adverse condition is in effect; and obtaining, on a next request to the CGN DHCP server to renew the lease on the public IP address, a new shared WAN IP address from the CGN IP address pool designated for CGN by the ISP, wherein the request to renew the lease on the public IP address includes a sub-option flag reflecting the updated CGN risk status.

20. The computer implemented method of claim 16, wherein the adverse condition comprises enabling of a Port Forward rule, enabling of a Port Trigger, designation of a demilitarized zone (DMZ) host, or enabling of a media access control address (MAC) bypass.

* * * * *

UNITED STATES PATENT AND TRADEMARK OFFICE
CERTIFICATE OF CORRECTION

| | | |
|---|---|---|
| PATENT NO. | : 12,137,078 B1 | Page 1 of 1 |
| APPLICATION NO. | : 17/743891 | |
| DATED | : November 5, 2024 | |
| INVENTOR(S) | : Pomeroy et al. | |

It is certified that error appears in the above-identified patent and that said Letters Patent is hereby corrected as shown below:

On the Title Page

Column 2, Item (57), in "Abstract", Line 9, after "provisioned" insert --with--.

Signed and Sealed this
Tenth Day of June, 2025

Coke Morgan Stewart
*Acting Director of the United States Patent and Trademark Office*